Patented Aug. 15, 1939

2,169,736

UNITED STATES PATENT OFFICE 2,169,736

ALKYLOLAMINO-METHYLENE COMPOUND AND METHOD OF MAKING

Jean G. Kern, East Aurora, N. Y., assignor to National Aniline and Chemical Company, Inc., New York, N. Y., a corporation of New York No Drawing. Application August 11, 1936, Serial No. 95,481

19 Claims. (Cl. 260—456)

This application relates to a new class of chemical compounds and to the production and use of such compounds. It is in part a continuation of my application Serial No. 691,819, filed October 2, 1933.

The present invention comprehends a new class of chemical compounds,—the alkylolamino-methylene sulfurous acids, sulfites, and sulfoxylates of the following general formula:

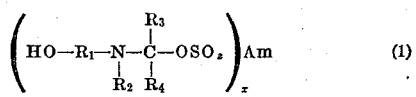

(1)

wherein $R_1$ represents a member of the group consisting of alkylene, cyclo-alkylene, hydroxy-alkylene, and polyhydroxy-alkylene radicals; $R_2$ represents a member of the group consisting of hydrogen, alkyl and cycloalkyl radicals, and the radical HO—$R_1$; $R_3$ represents a member of the group consisting of hydrogen and alkyl radicals; $R_4$ represents a member of the group consisting of hydrogen and alkyl radicals and, but only when $R_3$ represents H, aryl radicals; Am represents a member of the group consisting of hydrogen and metal atoms; $x$ is an integer which equals the valence of Am, and $z$ is an integer less than 3.

Compounds of the present invention may be prepared from primary or secondary alkylolamines by reaction thereof with a hydroxymethylene sulfite or sulfoxylate derived from an aldehyde or a ketone.

When derived from an aldehyde the compounds of the present invention may be represented by the formula:

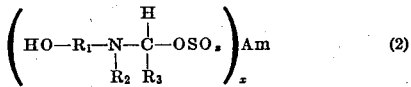

(2)

wherein $R_1$ represents a member of the group consisting of alkylene, cycloalkylene, hydroxyalkylene, and polyhydroxy-alkylene radicals; $R_2$ represents a member of the group consisting of hydrogen, alkyl and cycloalkyl radicals, and the radical HO—$R_1$; $R_3$ represents a member of the group consisting of hydrogen and alkyl and aryl radicals; Am represents a member of the group consisting of hydrogen and metal atoms; $x$ represents an integer equal to the valence of Am, and $z$ is an integer less than 3. When derived from a ketone the compounds of the present invention may be represented by the formula:

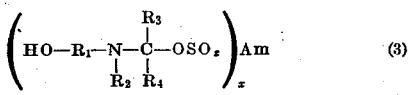

(3)

wherein $R_1$ represents a member of the group consisting of alkylene, cycloalkylene, hydroxy-alkylene, and polyhydroxy-alkylene radicals; $R_2$ represents a member of the group consisting of hydrogen, alkyl and cycloalkyl radicals, and the radical HO—$R_1$; $R_3$ represents an alkyl group; $R_4$ represents an alkyl group; Am represents a member of the group consisting of hydrogen and metal atoms; $x$ represents an integer equal to the valence of Am; and $z$ is an integer less than 3.

The compounds of the present invention are useful as bactericides, insecticides, and germicides. Such compounds wherein Am represents a copper or mercury atom are in particular notable for their parasiticidal activity.

The alkylolamino-methylene sulfites of the present invention are particularly suitable for use as intermediates in the preparation of many valuable compounds, for instance they may be employed for the preparation of alkylolamino-methylene nitriles, alkylolamino-methylene esters of diazo-sulfonic acids, alkylolamino-diazo compounds, and alkylolamino-sulfoxylates. The alkylolamino-sulfoxylates in turn, as well as the sulfites themselves, are valuable dye assistants.

The general reaction by which the compounds of the present invention may be prepared from aldehyde or ketone, hydrogen or metal sulfites and alkylol- or cyclo-alkylolamines is illustrated by the following equation applicable to the bisulfites and monovalent metal sulfites:

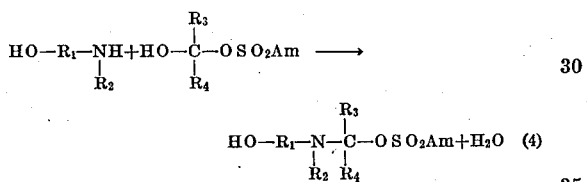

(4)

wherein $R_1$, $R_2$, $R_3$, and $R_4$ have the values assigned in Formula 1, and Am represents hydrogen or a monovalent metal. The reaction takes place readily at normal temperatures, usually with the evolution of heat. The rate of reaction ordinarily may be increased by raising the temperature to 50° C. to 70° C.

In the following examples the quantities are expressed as parts by weight.

EXAMPLE 1.—*Mono-ethanolamino-methylene sulfite of sodium*

104 parts anhydrous sodium bisulfite (1 mol) and 75 parts aqueous formaldehyde $CH_2O$, 40% solution, are mixed together slowly so that the heat of reaction does not raise the temperature of the reactive mixture above 70° C. After this first vigorous reaction is terminated, the temperature drops, and when it reaches about 50° C., about 100 parts water are added to the mixture which is kept at 50° C. until the crystals are entirely dissolved. To prepare the ethanolamino-methylene sulfite of sodium 61 parts of mono-ethanolamine, HO—$CH_2$—$CH_2$—$NH_2$ are added to the above solution while the mixture is agitated vigorously, and its temperature is allowed to rise to about 70° C. After about one hour of agitation at this temperature the reaction is substantially complete.

The resulting solution may be used directly, or, if a dry product is desired, the solution may be evaporated to dryness in vacuo. The product thus obtained has the following probable formula:

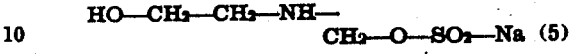

$$HO-CH_2-CH_2-NH-CH_2-O-SO_2-Na \quad (5)$$

This ethanolamino-methylene-sulfite of sodium is extremely soluble in water and has a very strongly alkaline reaction; it has far greater stability than its corresponding non-hydroxylated type, ethylamino-methylene sulfite of sodium, and in dry form it is very stable, but when it is exposed to the atmosphere, especially one that is warm and moist, it decomposes slowly. When heated in aqueous solutions of alkalis or acids (organic or mineral), this product splits up into its original components,—that is, ethanolamine, formaldehyde, and sulfur dioxide. This reaction tends to confirm the constitution assigned thereto in the formula above. The product also forms earth-alkali-metal salts, and heavy metal salts; among the latter the copper and mercury salts are of particular value as bactericides. The sodium salt of the product is an excellent bactericide, germicide and insecticide.

When they are treated with potassium cyanide or sodium cyanide, the hydroxy-alkylamino-methylene sulfites react to form nitriles (Knoevenagel, Ber. 37, 4075; Ber. 37, 4060; Ber. 38, 213), which, upon saponification, yield alpha-alkylolamino-acids. Thus ethanolamino-methylene potassium sulfite forms ethanolamino-methylene-nitrile, according to the equation (6)

$$HO-CH_2-CH_2-NH-CH_2-O-SO_2K+KCN \rightarrow$$
$$K_2SO_3+HO-CH_2-CH_2-NH-CH_2-CN$$

and this compound hydrolyzes readily to yield ethanolamino-acetic acid, according to the equation:

(7)

$$HOCH_2CH_2-NH-CH_2-CN+2H_2O \rightarrow$$
$$HO-CH_2-CH_2-NH-CH_2-COOH+NH_3$$

The hydroxy-alkylamino-methylene sulfites are readily reduced with Zn dust and acetic acid, and yield the corresponding formaldehyde sulfoxylates; thus ethanolamino methylene potassium sulfite yields ethanolamino-formaldehyde-sulfoxylate, according to the equation:

$$HOCH_2CH_2-NH-CH_2-OSO_2K+H_2 \rightarrow$$
$$HOCH_2CH_2-NH-CH_2-OSOK+H_2O \quad (8)$$

The last named product is a very stable compound which may be held in paste form or in solution in alkaline condition without appreciable decomposition.

*Example 2.—Diethanolamino-methylene-sulfite of sodium*

To the mono-molar solution of formaldehyde-bisulfite prepared as in Example 1, 105 parts of diethanolamine (1 mol) are added while the temperature of the reactive mass is not allowed to rise above about 75° C. The mixture is maintained between 70° C. and 75° C., for one to two hours, or until reaction is substantially complete. The solution thus obtained may be used directly, or if a dry product is desired, it is distilled in vacuo until sufficient excess water is removed to cause the diethanolamino-methylene-sulfite of sodium to crystallize from the solution. The product has the probable formula:

$$(HO-CH_2CH_2-)_2N-CH_2-OSO_2Na \quad (9)$$

It is a very stable compound in dry form or in aqueous solution. When treated with cold or hot caustic alkalis or acids, it is decomposed into diethanolamine, formaldehyde, and sulfur dioxide.

Its properties are for the most part similar to those of the product obtained in Example 1; but it has the properties of a tertiary amine, and is differentiated thereby from the product of Example 1.

When diethanolamino-methylene-bisulfite or the sodium salt thereof is submitted to reduction, for instance with Zn dust and glacial acetic acid, a body is formed which, as in Example 1, contains one oxygen atom less than the parent body; it is the corresponding diethanolamino-formaldehyde-sulfoxylate. This reducing reaction may be written as follows:

(10)

$$(HO-CH_2CH_2-)_2-N-CH_2-OSO_2Na+H_2 \rightarrow$$
$$(HO-CH_2CH_2-)_2N-CH_2OSONa+H_2O$$

The diethanolamino-formaldehyde-sulfoxylate product is a powerful reducing agent analogous to ordinary sodium formaldehyde sulfoxylate. At the same time it is a valuable solubilizing agent and may be used especially advantageously for the preparation of vat color pastes and powders.

The diethanolamino-methylene-sodium-sulfite product obtained in Example 2 is capable of forming earth-alkaline or heavy metal salts; these are characterized by insecticidal and germicidal qualities which are enhanced when the products are used in combination with the diazonium salts of diazotizable bases, for instance the diazonium salts of ortho-toluidine, meta-chloraniline, and dichlor-aniline.

*Example 3.—Mono-ethanolamino-ethylidene, potassium-sulfite*

44 parts of acetaldehyde, $CH_3-CHO$, (substantially free from polymerization products such as metaldehyde or paraldehyde) are added slowly to a vigorously agitated solution of 120 parts of potassium bisulfite dissolved in as little water as possible. The following reaction takes place:

$$CH_3-CHO+HO-SO_3K \rightarrow HO-\underset{CH_3}{\overset{|}{CH}}-OSO_2K \quad (11)$$

As soon as the temperature of the reaction mixture ceases to rise, 61 parts of mono-ethanolamine are added to the mass which is then maintained from 1 to 2 hours at about 70° C. The solution is then heated in vacuo to remove water, and leaves a white crystalline residue of mono-ethanolamino-ethylidene potassium sulfite. Its probable formula is:

$$HO-CH_2CH_2-NH-\underset{CH_3}{\overset{|}{CH}}-OSO_2K \quad (12)$$

This product is similar in its properties to the products obtained according to the preceding examples, and undergoes the same reactions.

*Example 4.—N-methyl-ethanolamino-methylene-sulfite of sodium*

In a preparation effected as described in Example 1, an equimolecular quantity of N-methyl-ethanolamine, $CH_3NHC_2H_4OH$, is substituted for the mono-ethanolamine. The resulting product has the following probable formula:

$$HO-CH_2CH_2-N-CH_2-OSO_2Na$$
$$\qquad\qquad\quad |$$
$$\qquad\qquad\quad CH_3 \qquad\qquad (13)$$

It has properties which are similar to those of the product of Example 2.

EXAMPLE 5.—*Mono-ethanolamino-isopropylidene-sodium sulfite*

58 parts of acetone, 104 parts of sodium bisulfite and 100 to 150 parts water are mixed very slowly until the reaction mass begins to cool down again. The reaction is preferably carried out in a vessel fitted with a reflux condenser. To the resulting mixture 61 parts of mono-ethanolamine are added and the solution is kept for two hours at a temperature of about 70° C. The reaction mixture is allowed to stand (about 16 hours) until the product crystallizes therefrom. The crystalline product is separated by filtration and dried. It formula is probably $$\qquad\qquad\qquad CH_3$$
$$\qquad\qquad\qquad |$$
$$HO-CH_2CH_2-NH-C-OSO_2Na \qquad (14)$$
$$\qquad\qquad\qquad |$$
$$\qquad\qquad\qquad CH_3$$

EXAMPLE 6.—*Diethanolamino-isopropylidene-sodium sulfite*

As in Example 5, a mixture of 58 parts of acetone and 104 parts of sodium bisulfite are reacted by adding thereto 50 parts of water, and after the first condensation is finished, 105 parts of diethanolamine are added to the mixture. The product which finally crystallizes from the reaction mixture in the form of beautiful white crystals, has the following probable formula:

$$\qquad\qquad\qquad CH_3$$
$$\qquad\qquad\qquad |$$
$$(HO-CH_2CH_2-)_2N-C-OSO_2Na \qquad (15)$$
$$\qquad\qquad\qquad |$$
$$\qquad\qquad\qquad CH_3$$

EXAMPLE 7.—*Mono-propanediolamino-benzal-sodium sulfite*

104 parts of sodium bisulfite are dissolved in 100 parts water and to the mixture 106 parts of benzaldehyde are added. When the reaction is finished 91 parts of amino-propanediol are added to the reaction mass which is then heated for about two hours at a temperature between 70° C. and 75° C. From the cooled reaction mixture a white crystalline product of excellent solubility is obtained. It is mono-propanediolamino-benzal-sodium sulfite which is probably represented by the formula,—

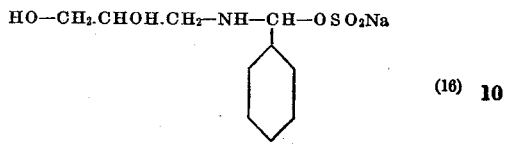

(16)

EXAMPLE 8.—185 parts benzaldehyde-ortho-sulfonic acid are dissolved in 1000 parts water with enough soda ash to just bring the product into solution. 104 parts sodium-bisulfite are added slowly; the temperature of the mixture rises to about 50° C. and is kept between about 50° C. and about 60° C. for about one-half hour. Now 105 parts diethanolamine are added slowly; the temperature of the mass rises to between 75° C. and 80° C. during the addition. The reaction mixture is kept between about 70° C. and about 75° C. for about two hours to complete the reaction. The product need not be isolated but may be used as a solution. The solution prepared as above will contain about 414 parts of the new compound having the following probable formula:

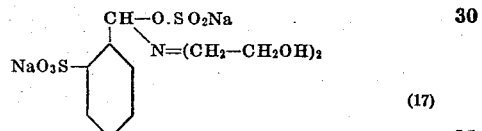

(17)

The procedure as outlined in the above examples may be used generally to prepare numerous similar products, variations of a minor nature being made to suit the requirements of the alkylolamine and the aldehyde or ketone used.

As further illustrations of alkylolamino-methylene-sulfites and alkylolamino-methylene-sulfurous acids which fall within the general formula given above, I have carried out, by the above methods, the following reactions to produce the indicated compounds:

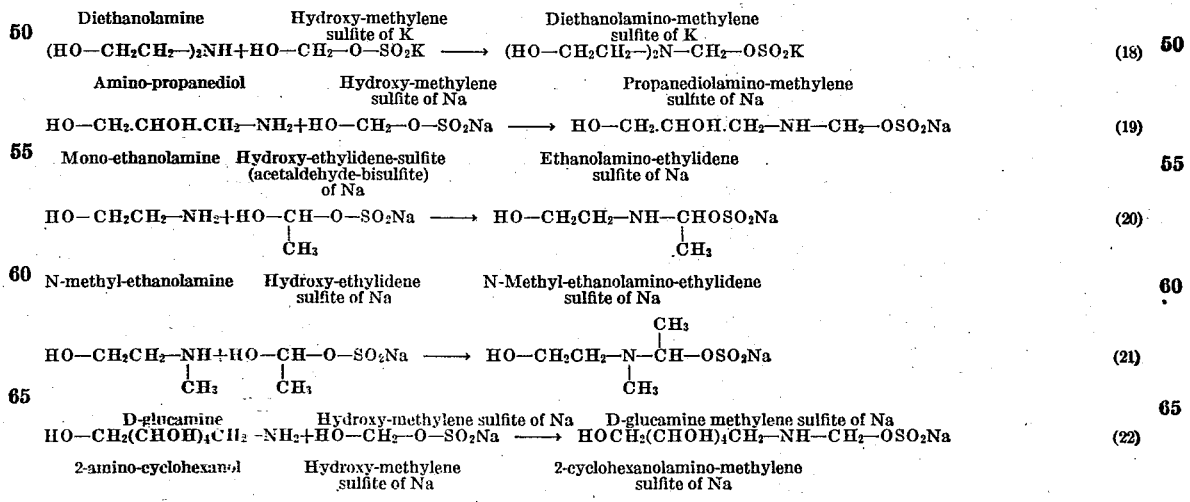

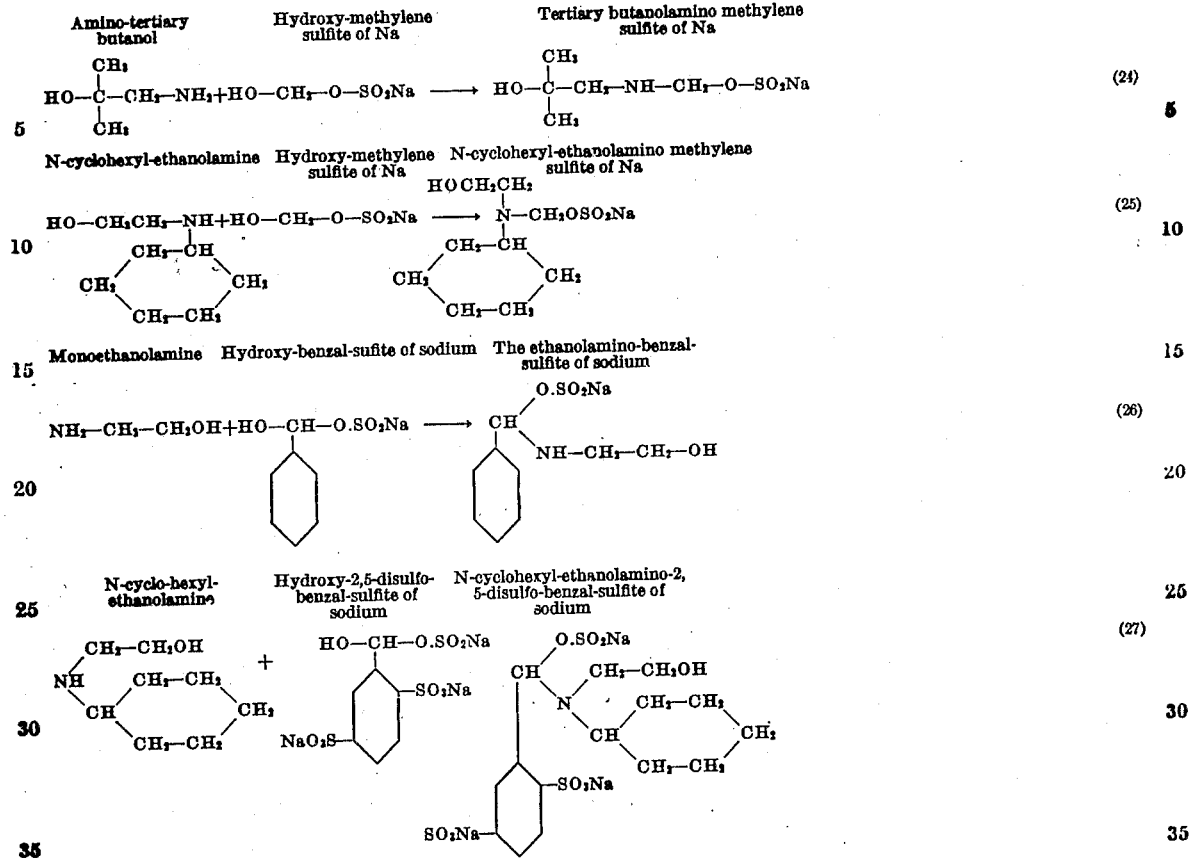

The following examples illustrate the use of alkylolamino-methylene sulfites, particularly in dye compositions which also contain dyeing and printing assistants.

EXAMPLE 9.—A vat color preparation may be obtained as follows:

100 parts of Carbanthrene Blue GCD, Color Index No. 1113, and containing 16.5 per cent dry color solids, and 1 per cent Leukanol are mixed with 82.5 parts of the sodium salt of diethanolamino-methylene-sulfurous acid and evaporated until the mixture attains the consistency of a heavy paste. The paste is then transferred to a drying pan and evaporated in vacuo at a temperature of about 60° C. The dried mass is ground to a fine powder and screened. The Carbanthrene Blue powder thus obtained is readily dispersible, can be used for printing and dyeing, and yields shades of great brilliancy with excellent penetration. It has working properties which are superior to those of ordinary Carbanthrene Blue GCD paste, and it yields for an equal weight of dye solids, stronger prints than the Carbanthrene Blue GCD from which it is made.

It is to be understood that the above vat dye preparation may comprise also other assistants, in particular the soluble partial ester salts of inorganic oxy-acids with mono- or polyhydroxy organic compounds, such as are disclosed in applications Serial Nos. 673,030 and 673,031, filed May 26, 1933. Thus, a vat powder of the following composition

| | Parts |
|---|---|
| Dry Blue GCD, Color Index No. 1113 | 16.5 |
| Dry Leukanol | 2 |
| Sodium isobutyl sulfate | 10 |
| Diethanolamino-methylene-sodium sulfite | 71.5 | is a product which disperses very readily in either water or printing paste.

Similar results are obtainable if in Example 9 any of the vat dyes mentioned in applications Serial Nos. 673,030 and 673,031 are substituted for the Carbanthrene Blue GCD. Similarly, the stated amino-methylene-sulfites may be replaced by any one or a mixture of hydroxy- or poly-hydroxy-alkylamino-methylene sulfites hereinbefore defined.

The paste or powder vat dyestuff preparations thus obtained may also contain any of the known assistants and catalysts as disclosed in the prior art, such as alkyl partial ester sulfates or phosphates, anthraquinone derivatives, alkylolamines, hydroxy-alkyl ethers, etc.

EXAMPLE 10.—100 parts of a press cake composed of 30 parts dry Carbanthrene Violet 2R, Color Index No. 1104, and 70 parts water are thinned with 6 parts Leukanol. To this mixture 85 parts of diethanolamine are added; the paste is stirred until it is homogeneous, then 109 parts anhydrous sodium formaldehyde bisulfite are added thereto, and the mixture is agitated and heated to about 70° C., until the bisulfite is completely dissolved, and the reaction is complete, i. e. from about 1½ hours to about 2 hours. Upon cooling the resulting mass a solid agglomeration is obtained which may be ground to a fine powder and used for dyeing and printing purposes. The final dry product is an intimate mixture of the vat dyestuff, Leukanol, and diethanolamino-methylene-sulfite of sodium.

If in the above example the formaldehyde bisulfite is replaced by an equivalent amount of formaldehyde sulfoxylate of sodium, the reaction proceeds in a similar manner, but it is preferable to evaporate the water from the reaction mixture in vacuo. The final dry product is a very intimate mixture of the dispersed vat dye, Leukanol, and diethanolamino-methylene-sulfoxylate of sodium. This vat dye preparation in the form of paste or powder has an advantage in dyeing and printing compositions and processes over other vat dye compositions since it contains both an assistant and a reducing agent in a combined form. Furthermore, the preparations of this type possess a high degree of uniformity since the amount of actual vat dye solids, and the amount of contained assistant-reductor are easily regulated, in the manufacture of the dye, to a very definite ratio, e. g., 10 parts dye for 50 parts assistant-reductor or more. The products can be dissolved, e. g., in an alkali-metal carbonate thickener, containing or not containing very small amounts of sodium formaldehyde sulfoxylate.

In the above examples Leukanol may be used in conjunction with or may be replaced by other wetting and dispersing agents.

The terms "alkyl" and "cycloalkyl", "alkylene" and "cycloalkylene" as used herein are intended to have their normal meaning designating hydrocarbon radicals of the chain and cyclic types respectively.

I claim:

1. As new products the compounds having the general formula:

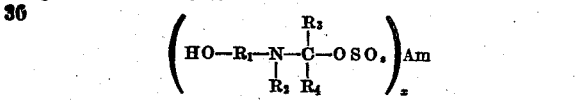

wherein $R_1$ represents a member of the group consisting of alkylene, cycloalkylene, hydroxy-alkylene, and polyhydroxy-alkylene radicals; $R_2$ represents a member of the group consisting of hydrogen, alkyl and cycloalkyl radicals, and the radical HO-$R_1$; $R_3$ represents a member of the group consisting of hydrogen and alkyl radicals; $R_4$ represents a member of the group consisting of hydrogen and alkyl radicals and, only when $R_3$ represents H, aryl radicals; Am represents a member of the group consisting of hydrogen and metal atoms; $x$ is an integer which equals the valence of Am; and $z$ is an integer less than 3.

2. A chemical compound of the group ethanolamino-methylene sulfurous acid and its alkali-metal salts.

3. A chemical compound of the group diethanolamino-methylene sulfurous acid and its alkali-metal salts.

4. A chemical compound of the group diethanolamino-isopropylidene sulfurous acid and its alkali-metal salts.

5. The process of making an alkylolaminomethylene sulfite compound, which comprises condensing a compound of the group consisting of aldehyde metal bisulfites and ketone metal bisulfites with an alkylolamine.

6. The process of making an alkylolaminomethylene sulfite compound, which comprises agitating a compound of the group consisting of aldehyde metal bisulfites and ketone metal bisulfites with an alkylolamine at a temperature between 50° and 70° C.

7. A process for making an ethanolaminomethylene sulfite, which comprises heating ethanolamine with an alkali-metal formaldehyde bisulfite.

8. A process for making a diethanolaminomethylene sulfite, which comprises heating diethanolamine with an alkali-metal formaldehyde bisulfite.

9. A process for making a diethanolamino-isopropylidene sulfite, which comprises heating diethanolamine with an alkali-metal acetone bisulfite.

10. The process of making a compound of the general formula:

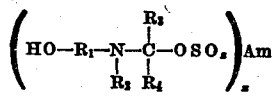

wherein $R_1$ represents a member of the group consisting of alkylene, cycloalkylene, hydroxy-alkylene, and polyhydroxy-alkylene radicals; $R_2$ represents a member of the group consisting of hydrogen, alkyl and cycloalkyl radicals, and the radical HO—$R_1$; $R_3$ represents a member of the group consisting of hydrogen and alkyl radicals; $R_4$ represents a member of the group consisting of hydrogen and alkyl radicals and, only when $R_3$ represents H, aryl radicals; Am represents a member of the group consisting of hydrogen and metal atoms; $x$ is an integer which equals the valence of Am; and $z$ is an integer less than 3, which comprises condensing an alkylolamine of the formula:

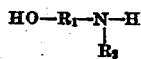

with a compound of the formula:

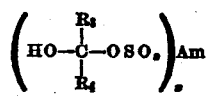

JEAN G. KERN.